United States Patent [19]

Inatsune et al.

[11] Patent Number: 4,726,935
[45] Date of Patent: Feb. 23, 1988

[54] APPARATUS FOR REMOVING NITROGEN OXIDES

[75] Inventors: Yoshiro Inatsune; Isato Morita; Tomihisa Ishikawa, all of Kure, Japan

[73] Assignee: Babcock-Hitachi Kabushiki Kaisha, Tokyo, Japan

[21] Appl. No.: 798,243

[22] Filed: Nov. 8, 1985

[30] Foreign Application Priority Data

Nov. 12, 1984 [JP] Japan ................................ 59-236824

[51] Int. Cl.$^4$ ................................................ B01J 8/04
[52] U.S. Cl. .................................... 422/171; 422/49; 422/193; 422/219; 436/37
[58] Field of Search .............. 422/171, 177, 178, 219, 422/49, 189, 193, 195; 423/239, 239 A; 436/37

[56] References Cited

U.S. PATENT DOCUMENTS

| | | | |
|---|---|---|---|
| 2,753,246 | 7/1956 | Shields et al. | 436/37 |
| 2,873,248 | 2/1959 | Tate et al. | 436/37 |
| 3,787,183 | 1/1974 | Kennedy, Jr. | 436/37 |
| 4,026,992 | 5/1977 | Shiga et al. | 423/239 |
| 4,307,068 | 12/1981 | Matsumoto et al. | 422/180 |
| 4,565,679 | 1/1986 | Michalak et al. | 423/239 |

FOREIGN PATENT DOCUMENTS

| | | | |
|---|---|---|---|
| 54-103775 | 8/1979 | Japan | 422/49 |
| WO80/02890 | 12/1980 | PCT Int'l Appl. | 422/49 |
| 927293 | 5/1980 | U.S.S.R. | 422/49 |

Primary Examiner—Michael S. Marcus
Attorney, Agent, or Firm—Antonelli, Terry & Wands

[57] ABSTRACT

In an apparatus for removing NOx from a flue gas comprising an ammonia injection tube in a flue gas duct, an NOx removal reactor containing a catalyst at the downstream side of the ammonia injection tube, and a bracket casing catalyst test pieces being provided in the reactor and fixed to the reactor in a detachable manner from the outside of the reactor apart from the catalyst, deterioration of catalyst can be monitored during the operation of the boiler plant and sampling of catalyst can be carried out through the catalyst sample pieces without discontinuing the operation of the apparatus for removing NOx.

7 Claims, 11 Drawing Figures

PRIOR ART

APPARATUS FOR REMOVING NITROGEN OXIDES

BACKGROUND OF THE INVENTION

This invention relates to an apparatus for removing nitrogen oxides from a combustion flue gas discharged from boilers, industrial furnaces, gas turbines, and a combustion facility for treating wastes. Nitrogen oxides will be hereinafter referred to merely as NOx.

Recently in Japan, the fuel species for combustion is changing from heavy oil to coal due to tight supply of heavy oil to reduce the petroleum dependency, and coal-fired boilers of large capacity for power plants are now under construction for utility companies. However, coal as fuel has poor combustibility as compared with petroleum fuel, and NOx and uncombusted matters are liable to be emitted into the flue gas from coal-fired boilers. To reduce emission of NOx, slow coal combustion has been carried out by dividing the combustion flame into sections, or recycling the flue gas, conducting the combustion at two stages or removing Nox within the furnace before emission to the outside.

In the coal-fired power plants, the boilers are operated not always under a full load, but under a variable load on the order of 75%, 50% or 25% of full load, or the boiler operation is discontinued, for example, according to the so called Daily Start-Stop schedule (which will be hereinafter referred to merely "DSS schedule") or the so called Weekly Start-Stop schedule (which will be hereinafter referred to merely as "WSS schedule"). That is, the coal-fired power plants operatable under such intermediate load have been in keen demand.

On the other hand, a combination of a gas turbine of good startup characteristics with a waste heat recovery boiler, i.e. the so called combined plant, is now going to be contructed to meet the power generation under the intermediate load besides the coal-fired boilers, and is to be operated only in the day time from Monday through to Friday according to the DSS or WSS schedule to meet the large power demand, and the operation is stopped at night or on Saturday or Sunday or holidays.

However, according to more stringent restriction of the NOx concentration of flue gas, power plants operatable under the intermediate load, which are provided not only with the conventional combustion improvement, but also with an apparatus for removing NOx by catalytic reduction by dry process, i.e. an apparatus for removing NOx with NH₃ as a reducing agent in the presence of a catalyst, have been now constructed in increasing numbers.

Particularly in the coal-fired boilers, the amount of NOx increases owing to the poor combustibility of the coal fuel itself, and also in the gas turbine plants, a large amount of NOx is contained in the flue gas, as in the coal-fired boilers, owing to a large amount of oxygen used and combustion at a higher temperature. That is, an apparatus for removing NOx, for example, as shown in FIG. 1, is usually installed in the power plant.

In FIG. 1, a typical flue duct for a boiler based on the equilibrium draft system, provided with an apparatus for removing NOx, is schematically shown.

Air for combustion in an air duct 1 is pressurized by a forcing draft fan (FDF) 2, heated by an air preheater 3 through heat exchange with the flue gas passing through a flue gas duct 4, and then supplied to a boiler 6 from a wind box (W/B) 5.

On the other hand, the combustion flue gas from the boiler 6 is passed through the flue gas duct 4, subjected to NOx removal by NH₃ injected from a NH₃ injection tube 7 while the removal of NOx is accelerated by a catalyst 9 in an NOx removal reactor 8, provided at the downstream side of the NH₃ injection tube 7, and passed through the air preheater (A/H) 3 and an electrostatic precipitator (EP) 10 after the removal of NOx from the flue gas, pressurized by an inducing draft fan (IDF) 11 and vented to the atmosphere.

Reaction temperature range for the NOx removal reactor 8 in the apparatus somewhat depends on the species of catalyst 9, but the temperature range of highest NOx removal efficiency is a relatively high and very narrow, such as 300° to 400° C. In the boilers or gas turbines operatable under the intermediate load, which are always operated according to the DSS or WSS schedule, the flue gas temperature widely fluctuates, depending on changes in the load, and often fails to fall within the said applicable reaction temperature range of catalyst 9.

When the flue gas temperature is much higher than the reaction temperature of catalyst 9, the structure of catalyst 9 will change and the function of catalyst 9 is deteriorated, whereas, when the flue gas temperature is much lower, the catalyst 9 will react with sulfuric anhydride ($SO_3$) existing in the flue gas, deteriorating the catalyst 9.

On the other hand, when tubes of boiler 6 are damaged, the operation of boiler 6 is stopped immediately, and the boiler 6 itself is forcedly cooled with the air for combustion from the air duct 4 by FDF 2, and steam or water leaked from the damaged tubes of boiler 6 is entrained with the combustion gas and discharged as a highly humid gas from the boiler 6. The discharged flue gas carries water mists below about 100° C.

Deteriorating components such as alkali metals, etc. dissolved in the steam or water leaked from the tubes flow into the NOx removal reactor 8 through the flue gas duct 4 and deteriorate the catalyst 9.

The activity of the catalyst used in the reactor 8 is gradually lowered with time, as the operation of boiler 6 is continued, and thus it is necessary to provide a means for monitoring the activity of catalyst 9 to determine the timing of exchanging the catalyst 9 or regenerating the catalyst 9. When the performance of catalyst 9 is lowered by a sudden accident, etc. in the boiler 6, as described above, it is important to investigate causes to lower the catalyst performance and take an inmediate measure to cope with the causes. In any case, it is a key to investigate the performance of catalyst 9 itself. It is the ordinary expedient to sample the catalyst 9 periodically or when required to monitor or detect the deterioration in performance of catalyst 9. The catalyst 9 is usually packed in catalyst packages of integrated structure in the reactor 8 so that no clearances may be formed between the catalyst packages to prevent a gas leakage therebetween. Thus, it takes much labor and time to sample even a small amount of catalyst necessary for the monitoring and detection from the catalyst packages. As shown in FIG. 2, it is the ordinary expedient to provide a small number of catalyst test pieces 12 in the catalyst packages in the NOx removal reactor 8. To take the catalyst test pieces 12 out of the catalyst packages in the reactor 8, workers must enter the reactor 8. That is, the catalyst test pieces 12 can be taken out only after the flue gas has been completely shut off from the boiler 6 and also from the reactor 8 and the temperature within the reactor 8 has been cooled down to the ambient temperature. Thus, it takes much labor and time to take out catalyst test pieces 12 from the catalyst packages in the reactor 8. In the case of an emergency such as a boiler accident, etc., it is considerably delayed to take the necessary measure for preventing the deterioration of catalyst 9. Furthermore, discontinuation of operation of reactor 8 even for a few days for taking out catalyst test pieces 12 from the catalyst packages is not preferable from the viewpoint of environmental pollution, because NOx as bypassed is discharged into the atmosphere during the discontinuation of NOx removed reactor.

As shown in FIG. 2, the catalyst 9 is provided in a plurality of stages to facilitate exchanging of catalyst 9 in the case of catalyst deterioration. The flue gas passes through such a plurality of stages of the catalyst 9 at an equal flow rate, but since the catalyst-deteriorating components contained in the flue gas are adsorbed onto the catalyst 9 to some degree, the influence of the flue gas property on the catalyst activity differs between the catalyst stage near the inlet of the reactor 8 and that near the outlet of the reactor 8, and thus the degree of catalyst deterioration differs from one catalyst stage to another in the reactor 8. If detailed data on how the catalyst deterioration is distributed throughout the reactor 8 are available, the catalyst performance can be economically controlled by exchanging only the deteriorated catalyst, etc. However, to obtain such detailed data according to the conventional sampling procedure, catalyst test pieces 12 for sampling must be provided at so many positions throughout the reactor 8, complicating the structure of reactor 8 and consuming much labor and time in taking out the so many distributed catalyst test pieces 12 from the catalyst packages for the sampling. When the catalyst test pieces are taken out according to the conventional sampling procedure, catalyst must be filled into the sampled spaces to prevent a gas flow disturbance and maintain the performance. Thus, a larger amount of catalyst must be made ready for operation. Such a measure is actually quite impossible.

SUMMARY OF THE INVENTION

An object of the present invention is to provide an apparatus for removing NOx which can overcome the problems of the prior art, that is, which can monitor deterioration of the catalyst even during the operation and can take out catalyst test pieces without discontinuing the operation of the apparatus.

The object of the present invention can be attained by providing a bracket encasing catalyst test pieces in an NOx removal reactor, withdrawing the bracket from the NOx removal reactor, and taking out a catalyst test piece from the bracket for sampling. The degree of catalyst deterioration can be monitored by investigating the sample catalyst obtained by withdrawing the bracket encasing catalyst test pieces from the NOx removal reactor.

PREFERRED EMBODIMENTS OF THE INVENTION

Figure 1:
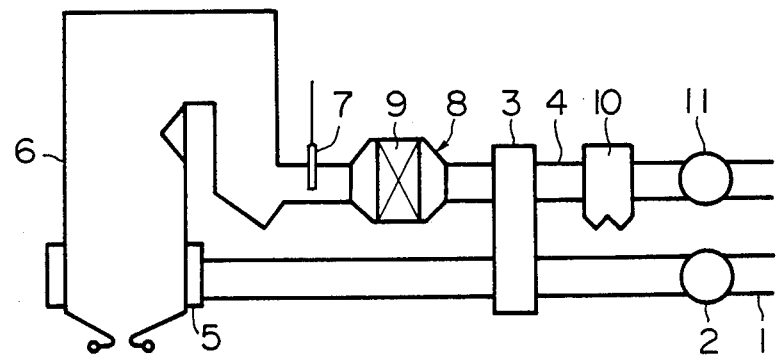
FIG. 1 is a schematic view showing an equilibrium draft system in a boiler.
Figure 2:
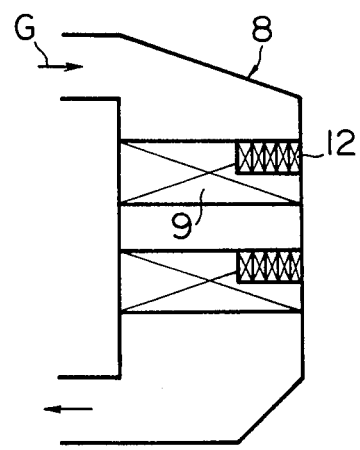
FIG. 2 is a cross-sectional view showing an NOx removal reactor according to the prior art.

Embodiments of the present invention will be described in detail below referring to the drawings.

Figure 3:
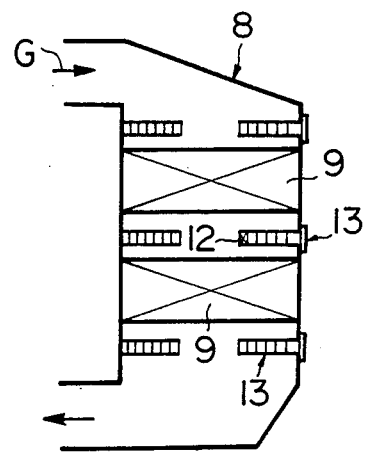
FIG. 3 is a cross-sectional view showing an Nox removal reactor according to one embodiment of the present invention.
Figure 4:
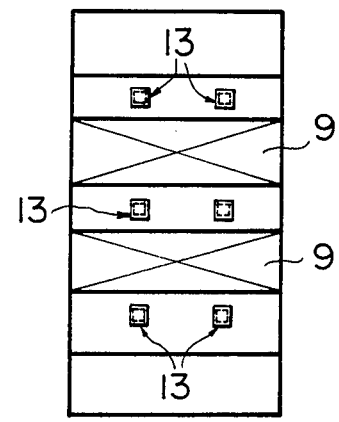
FIG. 4 is a side view of FIG. 3.

In FIGS. 3 and 4, one embodiment of the present invention in a vertical flow type, NOx removal reactor is shown. As shown in FIG. 3, the catalyst 9 and catalyst test pieces 12 are provided as groups in zones separated from one another in the reactor 8 and the catalyst test pieces 12 are inserted into brackets 13. One end of the bracket 13 is positioned inside the reactor 8 to cross the flue gas stream at the right angle thereto.

Figure 5:
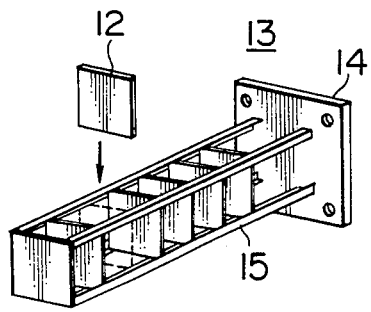
FIG. 5 is a perspective view of a bracket according to one embodiment of the present invention.

In FIG. 5, the bracket is shown in a perspective view, where the bracket 13 comprises a flange 14 and 4 L-shaped steel bars 15 supported by the flange 14 at one end so that the flue gas G can freely pass through the bracket 13.

Figure 6:
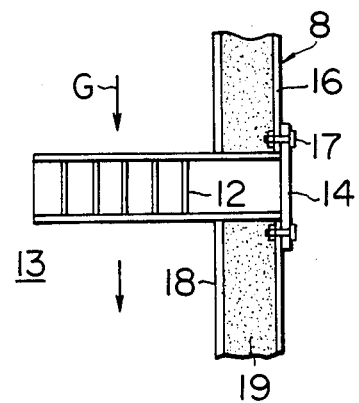
FIG. 6 is a cross-sectional view of the bracket of FIG. 5.

As shown in FIG. 6, the bracket 13 is fixed in a detachable manner to the outer casing 16 of the reactor 8 by means of the flange 14. To take out the catalyst test pieces 12, the bracket 13 is withdrawn outwardly from the reactor 8 by disengaging bolts and nuts at the flange 14, and the catalyst test pieces 12 are taken out of the withdrawn bracket 13. The catalyst test pieces 12 shown in FIGS. 5 and 6 are of a plate type having a size of, for example, 100 mm × 100 mm. The size, species and shape of the catalyst are not particularly limited. In FIG. 6, numeral 18 is an inner casing and 19 is a heat-insulating material.

Figure 7:
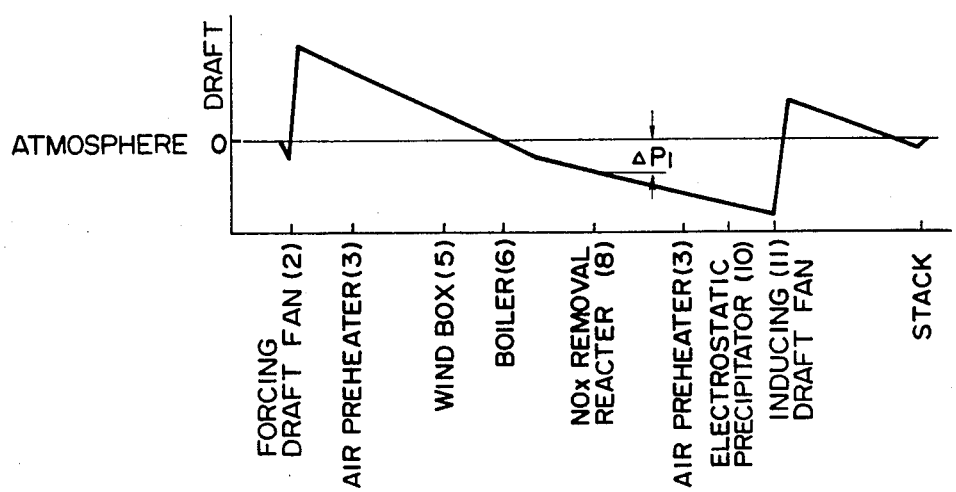
FIG. 7 is a diagram showing a draft pressure drop characteristics of individual units, plotted in relation to the draft on the ordinate and the positions of the individual units in an equilibrium draft system in a boiler plant.

FIG. 7 shows a draft pressure drop characteristic diagram of the individual units, plotted in relation to the draft on the ordinate and the positions of the individual units in an equilibrium draft system in a boiler plant on the abscissa.

In a boiler plant based on the equilibrium draft system, the position at the NOx removal reactor 8 is provided is lower in pressure (in minus pressure) only by $\Delta P_1$ than the atmospheric pressure (zero). Thus, the deterioration of catalyst 9 can be monitored by means of catalyst test pieces 12 by withdrawing the bracket 13 from the NOx removal reactor 8 even during the operation of the boiler plant, and thus the catalyst test piece 12 can be taken out from the withdrawn bracket for sampling while continuing NOx removal by the catalyst 9 in the NOx removal reactor 8.

In the foregoing embodiment shown in FIGS. 3 to 6, description has been made of a plate type catalyst, but the bracket 13 according to the present invention can be also applied to a honeycomb type catalyst, a pellet type catalyst by modifying the shape of catalyst test piece 12.

Figure 8:
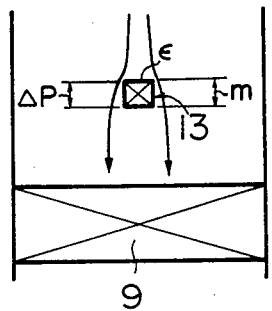
FIG. 8 is a schematic view illustrating the pressure drop by a catalyst test piece as an inconvenience, where the gas fails to pass through the test piece when $\Delta P$ of the catalyst test piece is too high.

Pressure drop on the catalyst test piece shown in FIG. 8 depends on the void ratio ε of catalyst test piece 12 in the gas flow direction, the length m of catalyst test piece 12 in the gas flow direction, etc., but the pressure drop ΔP can be made smaller by shortening the length of catalyst test piece 12. Thus, the present invention is well applicable even to the honeycomb type catalyst and the pellet type catalyst which are generally considered to have a large pressure drop ΔP.

Figure 9:
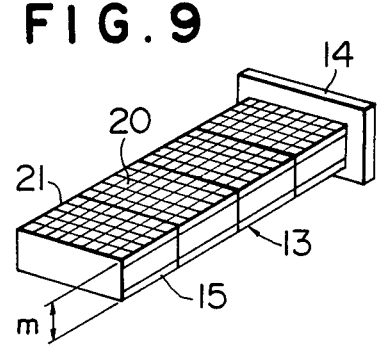
FIGS. 9 and 10 are perspective views showing a bracket according to another embodiment of the present invention.
Figure 10:
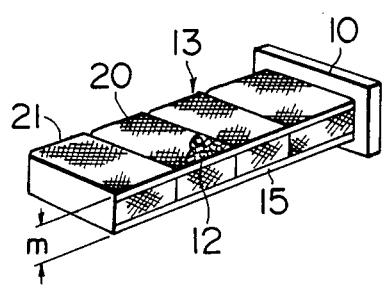

FIG. 9 shows an application of the present invention to the honeycomb type catalyst and FIG. 10 that to the pellet type catalyst. In the case of the honeycomb type catalyst and the pellet type catalyst shown in FIGS. 9 and 10, respectively, catalyst test pieces 12 are placed in a case 21 enclosed with wire nettings 20.

Figure 11:
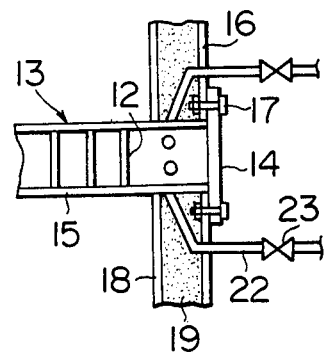
FIG. 11 is a cross-sectional view of the bracket according to another embodiment of FIG. 6.

FIG. 11 is a side view of another embodiment of FIG. 6, where numerals 10 to 19 correspond to the same members as shown in FIG. 6, and numeral 22 is sealing pipes and 23 valves.

In FIGS. 3 to 10, applications of the present invention to a boiler plant based on the equilibrium draft system are shown, whereas in FIG. 11 an application of the present invention to a boiler plant based on the forced draft system where drafting is carried out only with FDF 2 without using IDF 11 of FIG. 1 is shown. That is, in a boiler 6 drafted only with FDF 2, the position at which the NOx removal reactor 8 is located has a higher pressure than the atmospheric pressure.

To withdraw the bracket 13 of FIG. 11 from the reactor, sealing air is injected to the bracket support positions from the sealing pipes 22 by opening the valves 23 in the sealing pipes 22. The flue gas can be prevented from discharging from the reactor by the sealing air injected around the bracket support positions. Thus, even if the reactor 8 has a higher pressure than the atmospheric pressure in the flue gas duct 4 during the operation of boiler 6, the catalyst can be monitored by withdrawing the bracket 13 and taking out the catalyst test piece 12 from the withdrawn bracket 13.

In the present invention, deterioration of catalyst can be monitored during the operation of a boiler plant and sampling of catalyst can be carried out through catalyst test pieces without discontinuing the operation of an apparatus for removing NOx by providing brackets casing the catalyst test pieces in an NOx removal reactor.

What is claimed is:

1. An apparatus for removing nitrogen oxides from a flue gas flowing through a flue gas duct, which comprises an ammonia injection tube for injecting ammonia in a flue gas duct, a nitrogen oxide removal reactor communicating with the flue gas duct containing a catalyst bed in a zone downstream of the ammonia injection tube, and bracket means for supporting catalyst test pieces arranged in the reactor close to but spaced apart from the catalyst bed and detachably fixed to access means in a side wall of the reactor so that pieces can be withdrawn from the reactor without discontinuing operation of the reactor; said catalyst test pieces exhibiting the same activity for removing nitrogen oxides and being subjected to the same reaction conditions as said catalyst bed; and the dimensions of the test pieces and associated bracket means being substantially smaller than the catalyst bed.

2. An apparatus according to claim 1, further comprising a flue gas line of a boiler, the flue gas duct being connected to the flue gas line of the boiler.

3. An apparatus according to claim 2, wherein an inducing draft fan is provided downstream of the reactor whereby said boiler operates as a equilibrium draft system.

4. An apparatus for removing nitrogen oxides from a flue gas flowing through a flue gas duct, which comprises a flue gas duct connected to the flue gas line of a boiler, an ammonia injection tube for injecting ammonia in the flue gas duct, a nitrogen oxide removal reactor communicating with the flue gas duct containing a catalyst bed in a zone located on a downstream side of the ammonia injection tube, the downstream side of the reactor being open to the atmosphere, bracket means for encasing catalyst test pieces being provided in the reactor and detachably fixed to access means in a side wall of the reactor so that test pieces can be withdrawn from the reactor without discontinuing operation of the reactor, and a sealing pipe for injecting sealing air into the access means when the bracket means is taken from the reactor via said access means; said catalyst test pieces exhibiting the same activity for removing nitrogen oxides and being subjected to the same reaction conditions as said catalyst bed; and the dimensions of the test pieces and associated bracket means being substantially smaller than the catalyst bed.

5. An apparatus according to claim 1 or claim 4, wherein the catalyst bed is provided at a plurality of zones in stages in an axial direction of the reactor and the bracket means is provided in the reactor close to but spaced apart from the catalyst bed at each of the stages.

6. An apparatus according to claim 1 wherein the bracket means is horizontally detachable at a side of the reactor.

7. An apparatus according to claim 1, wherein the bracket means comprises a flange engageable with the outside of the reactor, and a support encasing the catalyst test pieces and being supported by the flange and extended in a horizontally direction in the reactor, the flange being supported on the outside of the reactor by a detachable securing means.

* * * * *